US007259751B2

(12) United States Patent
Hughes et al.

(10) Patent No.: US 7,259,751 B2
(45) Date of Patent: Aug. 21, 2007

(54) INPUT SYSTEMS AND METHODS FOR THE EVALUATION AND OPTIMIZATION OF SAME

(75) Inventors: Dominic Hughes, San Francisco, CA (US); James Warren, Mountain View, CA (US); Orkut Buyukkokten, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 813 days.

(21) Appl. No.: 10/771,849

(22) Filed: Feb. 3, 2004

(65) Prior Publication Data

US 2004/0205257 A1   Oct. 14, 2004

Related U.S. Application Data

(60) Provisional application No. 60/444,704, filed on Feb. 3, 2003.

(51) Int. Cl.
*G09G 5/00* (2006.01)
(52) U.S. Cl. ...................... 345/169; 400/489
(58) Field of Classification Search ........ 345/168–169; 707/1, 6; 715/703; 235/145 R; 706/60; 702/182; 700/14; 710/43, 1; 382/209; 400/486, 400/489; 451/1; 341/22, 23
See application file for complete search history.

(56) References Cited

U.S. PATENT DOCUMENTS

| | | | | |
|---|---|---|---|---|
| 5,487,616 A | 1/1996 | Ichbiah | ...................... | 400/489 |
| 5,933,138 A | 8/1999 | Driskell | ...................... | 345/702 |
| 6,295,509 B1 | 9/2001 | Driskell | ...................... | 702/182 |
| 6,526,401 B1 * | 2/2003 | Ito | ................................ | 707/3 |
| 6,643,371 B2 * | 11/2003 | Mager | ................... | 379/355.07 |
| 6,646,572 B1 * | 11/2003 | Brand | ......................... | 341/22 |

OTHER PUBLICATIONS

I. Scott Mackenzie et al., "Text entry using soft keyboards." 1999. Behavior & Information Technology, 18, 235-244.

(Continued)

*Primary Examiner*—Richard Hjerpe
*Assistant Examiner*—Abbas Abdulselam
(74) *Attorney, Agent, or Firm*—Lumen Intellectual Property Services, Inc.

(57) ABSTRACT

A method for evaluating an input system interfacing a human user with an electronic device uses empirically determined bi-action times for users to perform a second input action (e.g., pressing a second key) immediately after performing a first input action (e.g., pressing a first key). The bi-action times (or, more generally, n-action times) are used together with a selected interface map which associates input actions (e.g., pressing keys) to corresponding signifiers (e.g., characters) to calculate a peak expert input rate for the input system. One or more optimized interface maps can be found by combining the evaluation method with any of various optimization strategies. For example, one method for optimizing the input system repeatedly changes the interface map and recalculates the peak expert input rate, while another optimization method calculates peak expert input rates for multiple interface maps in parallel. The evaluation and optimization methods apply to a wide variety of users, input devices, and types of communication and control between them.

14 Claims, 10 Drawing Sheets

OTHER PUBLICATIONS

Miika Silfverberg et al., "Predicting text entry speed on mobile phones." Proceedings of the ACM conference on human factors in computing systems. CHI 2000, pp. 9-16, New York.

"Designing a high-performance soft keyboard," MacKenzie, I. S., & Zhang, S. Z. (1999). The design and evaluation of a high performance soft keyboard. *Proceedings of the ACM Conference on Human Factors in Computing Systems—CHI '99*, New York: ACM, pp. 25-31.

* cited by examiner

|   |   |   |   |   |   |
|---|---|---|---|---|---|
| Q | F | U | M | C | K | Z |
| SPACE | | O | T | H | SPACE | |
| B | S | R | E | A | W | X |
| SPACE | | I | N | D | SPACE | |
| J | P | V | G | L | Y | |

FIG. 2C

|   |   |   |   |   |   |
|---|---|---|---|---|---|
| Z | V | C | H | W | K |
| F | I | T | A | L | Y |
| SPACE | | N | E | SPACE | |
| G | D | O | R | S | B |
| Q | J | U | M | P | X |

FIG. 2D

|   | K | G | I | C | Z |
|---|---|---|---|---|---|
|   | F | N | T | H | W |
| Q | O | S | SPACE | A | Y |
| J | U | R | E | D | V |
|   | P | M | L | B | X |

FIG. 8A

|   | Z | F | C | U | Q |
|---|---|---|---|---|---|
|   | V | O | I | N | G |
| J | M | R | T | A | L |
|   | P | E | SPACE | S | Y |
| X | K | H | D | W | B |

FIG. 8B

|   | Q | P | Y | U | J |
|---|---|---|---|---|---|
|   | C | S | T | O | B |
| K | L | H | SPACE | R | M |
| X | I | A | E | D | F |
| Z | V | W | N | G |   |

FIG. 8C

|   | W | G | I | C | Z |
|---|---|---|---|---|---|
|   | D | N | T | H | K |
| F | O | SPACE | E | S | V |
| J | U | R | A | L | X |
| Q | P | M | Y | B |   |

FIG. 8D

INPUT SYSTEMS AND METHODS FOR THE EVALUATION AND OPTIMIZATION OF SAME

CROSS-REFERENCE TO RELATED APPLICATIONS

This application claims priority from U.S. provisional patent application No. 60/444,704 filed 3 Feb. 2003, which is incorporated herein by reference.

FIELD OF THE INVENTION

This invention relates generally to the field of computer-human interface systems and methods for their design. More specifically, the invention relates to improved input systems and methods for evaluating and optimizing input systems.

BACKGROUND OF THE INVENTION

As computers and electronic devices become more ubiquitous, it becomes increasingly important that computer-human interfaces allow easy and efficient communication with these devices. With many people interacting with devices for longer periods of time, improvements in input systems can have significant benefits. For example, considerable research has focused on various types of input systems for personal data assistants (PDAs). One popular PDA input system displays a virtual keyboard 100 on a touch-sensitive display 110, as shown in FIG. 1. By tapping the displayed keys with a stylus 120, a user can input a desired sequence of characters. The particular layout of characters on the virtual keyboard 100 is shown in detail in FIG. 2A. Although this simple ABC layout is attractive because it can be quickly learned by a novice, it is not the most efficient layout for expert users. Since common keys such as space, E, and A, are not centrally located, the user will often need to move the stylus large distances across the keyboard. FIG. 2B shows a slightly improved layout with the space key centrally located. This ABC-center layout is somewhat more efficient, but still far from optimal. The input system design problem for this device is to determine the layout that provides the highest text input speed for expert users. In short, the problem is to find the layout associated with the highest peak expert input rate.

One method for searching for the optimal layout is empirical trail-and-error. As illustrated in FIG. 3, the first step 300 of this approach is to select an input device and input data corpus. The data corpus contains information that is considered representative of data expected to be entered during typical use of the device (e.g., collections of common sentences, phrases, words, and other character sequences). In the next step 310, a particular key layout, or interface map, is selected. The map is a particular assignment of characters to the keys on the virtual keyboard (e.g., the ABC key layout shown in FIG. 2A). Then, in step 320, a group of representative users is trained with the resulting input system until they reach expert level. Their input rates are then empirically measured. These measured rates will depend on the selected keyboard layout. At decision block 330, it is decided whether or not a satisfactory layout has not been found. If not, one returns to step 310 and selects another key layout (e.g., the ABC-center layout shown in FIG. 2B). Another empirical trial is then performed in step 320 to test the new key layout. When the empirical tests are complete, the layout with the highest rate is selected at step 340.

There are several major difficulties with this trial-and-error method. One problem is that it is very expensive and time consuming to perform an empirical trail for every layout tested for the device, training a group of users to expert level each time. It is not practical to test more than a few layouts, and it is impossible to exhaustively test the entire set of more than $10^{25}$ layouts. In addition, of the handful of layouts selected for testing, there is no proof that the optimal layout is among them. This approach provides no systematic method for selecting good layouts to test, or for ensuring that the next layout tested will be any better than the last. The trial-and-error method for searching for the optimal layout is more of an art than a science, and it is not likely to effectively optimize the layout for the device. The problem of optimizing the input system thus remains unsolved.

There is a systematic method of searching for an optimal layout while avoiding some of the drawbacks of empirical trial-and-error. Instead of measuring the input speeds of real users trained to expert level, this approach uses an empirically-calibrated theoretical model of human movement to predict the input speeds of model users. Combining these predicted movement speeds with a keyboard layout map and a model of the data corpus, a peak expert input rate for the layout can be calculated. A similar calculation can be performed for various alternative layouts, allowing a large number of different layouts to be tested and compared without additional empirical measurements. As illustrated in FIG. 4, the first step 400 of this method selects an input device and data corpus. In the next step 410, empirical measurements are made of users entering data using the device. These measurements are used in step 420 to calibrate the theoretical model of human movement to the particular device. (For example, Fitts' law of human movement models the time to hit a second key immediately after hitting a first key as a function of the distance between the two keys and the size of the second key. The function has two parameters that are adjusted to fit the model to the empirical measurements made with the input device.) Once the model is calibrated, the empirical data are discarded and are not used further. In the first step of the iterative search, a particular layout is selected in step 430. Then, in step 440, the peak expert input rate is calculated using the calibrated model. For example, combining the key distances with the layout information allows the model to predict the time to enter a second character immediately following a first character. Statistical information about the data corpus (specifically, bi-gram probabilities representing how often one character is followed by another in the data corpus) are then combined with these predictions to calculate a predicted peak expert input rate. At step 450 a decision is made whether or not to select another layout and repeat the calculation. Finally, after calculations have been performed for various layouts, the layout with the highest predicted peak expert input rate is selected in step 460. FIGS. 2C and 2D show examples of two layouts, called OPTI and FITALY, which were found using this technique based on empirically-calibrated theoretical models.

Using a theoretical model to search for optimal layouts allows a computational search to replace expensive and time-consuming empirical trials. However, this theoretical approach has significant problems of its own. For example, Fitts' law is inaccurate for small movements (i.e., one or two key widths). Because a large proportion of movements during input involve such small movements, the predicted input rates will be inaccurate, distorting the optimization process. In addition, Fitts' law is an overly simplistic model of human movement because it assumes that the movement time depends only on the distance between keys, and not on any other factors. Insofar as such factors may significantly correlate with movement time, the predicted input rates will be even more inaccurate since the model fails to take these factors into account. Theoretical models like Fitts' law are also limited to a small class of keyboard-like input devices because they are based on the assumption that input actions are linear movements of a single pointer between selectable elements in a plane. The models cannot be applied to other types of input device actions, such as ten fingers using a conventional keyboard, or intricate hand gestures using a glove interface.

Although the current challenges of input system design have been illustrated above using the example of trying to find an optimal layout of a keyboard for stylus-based input to a PDA, they also apply to many other types of human-computer interface design. For example, similar problems arise when searching for an optimal layout of characters on a conventional keyboard, as well as on other keypads and keyboards commonly used for interfacing with electronic devices such as cellular telephones, pocket personal computers, calculators, microwave ovens, automated teller machines, and airline check-in kiosks, just to name a few.

The problem also applies to the design of input systems that do not involve keyboards with characters. To state the problem more generally, given 1) an input device that translates a set of distinguishable user actions into a set of unique input signals, 2) a set of unique signifiers that a user desires to communicate using the input device, and 3) knowledge of the patterns of signifiers expected to be communicated, the problem is to find an optimized map between the input device signals and the set of distinct signifiers.

Existing input system optimization methods based on theoretical models provide only inaccurate solutions and are limited to a relatively small class of simple user interface devices. Methods based on empirical testing, on the other hand, are very time consuming, expensive, and are based largely on guesswork. Therefore, there is a need for methods to design input systems that overcome the problems of both empirical trail-and-error approaches and approaches based on theoretical models of movement.

SUMMARY OF THE INVENTION

The present invention provides improved user input systems as well as methods for evaluating and optimizing designs of user input systems. The approach of the present invention does not require repeated empirical trial-and-error testing to find an optimized input system. Nor does the approach of the invention suffer from the limitations and inaccuracies of methods based on theoretical models. For example, in the case of keyboard-type devices, the approach is valid for small movements, and captures the dependency of movement time on absolute positions of keys and directions of movements between keys. Moreover, the approach of the invention may be applied to many types of input systems and is not limited to a small class of input systems.

According to one embodiment of the invention, a method is provided for evaluating an input system interfacing a human user with an electronic device. The input system comprises an input device and an interface map that the input device translates a set of distinguishable user movements into a set of unique input signals. The interface map provides a mapping from the set of input signals to a set of unique signifiers that may be communicated by a user using the input device. The method calculates a peak expert input rate for the input system from a) information characterizing the patterns of signifiers expected to be communicated (such as bi-gram statistics representing how often one signifier is followed by another in the input data corpus), and b) empirically determined user input action statistics associated with the input device and a set of representative users.

In one embodiment, the user input action statistics are bi-action statistics that comprise, for each ordered pair of distinguishable user input actions, a time to perform the second action immediately after performing the first action. For example, these bi-action statistics may be represented as a bi-action table of $K^2$ time values, where K is the total number of distinguishable user input actions. These times are determined from empirical measurements involving the set of representative users performing the set of distinguishable user movements using the input device. The times, however, are independent of any particular interface map for the input system. The action statistics, in other words, characterize the physical actions of users interacting with the input device, independent of how the actions are translated by the input device and interface map to characters or other signifiers. The bi-action statistics, therefore, are valid for a particular input device and set of representative users, regardless of the interface map.

According to another embodiment of the invention, the peak expert input rate may be calculated for various alternative interface maps, and an interface map associated with the highest peak expert input rate may be selected to determine an optimized input system. The peak rates for the alternative maps may be calculated sequentially, in parallel, or using some combination of the two. In some embodiments, an optimization strategy is used with the evaluation method to search for an optimized interface map.

According to another embodiment of the invention, user input action statistics in the above method may be tri-action statistics (i.e., a table of $K^3$ time values) or, more generally, n-action statistics (i.e., a table of $K^n$ time values), for any integer $n \geq 2$. Similarly, information characterizing the patterns of signifiers expected to be communicated may be tri-gram statistics or, more generally, n-gram statistics representing how often each ordered n-tuple of signifiers appears in the input data corpus.

The techniques of the invention provide input systems with high peak expert input rates. An input system of the present invention comprises an input device that translates a set of distinguishable user movements, or actions, into a set of unique input signals, together with an interface map mapping the input signals to a set of signifiers. The input system thus transforms the user actions into the signifiers. With a given input device, the optimization of the interface map results in an optimized input system, i.e., an input system with a high peak expert input rate.

The techniques of the invention can be used for evaluating and comparing several selected interface maps for a predetermined input device, or for searching many or all possible interface maps to identify an optimized map for a given input device. The technique can be used for designing optimized input systems customized for a specific user or set of users (e.g., left-handed users, or disabled users) whose physical interaction with the device is different from the majority of users. The technique can also be used for designing optimized systems customized to different bodies of data, or different languages.

BRIEF DESCRIPTION OF THE DRAWINGS

FIGS. 2A-2D illustrate various known keyboard layouts for the input system of FIG. 1.

FIGS. 8A-8D illustrate various layouts for the input system of FIG. 1 as discovered using techniques of the present invention.

DETAILED DESCRIPTION

Figure 1:
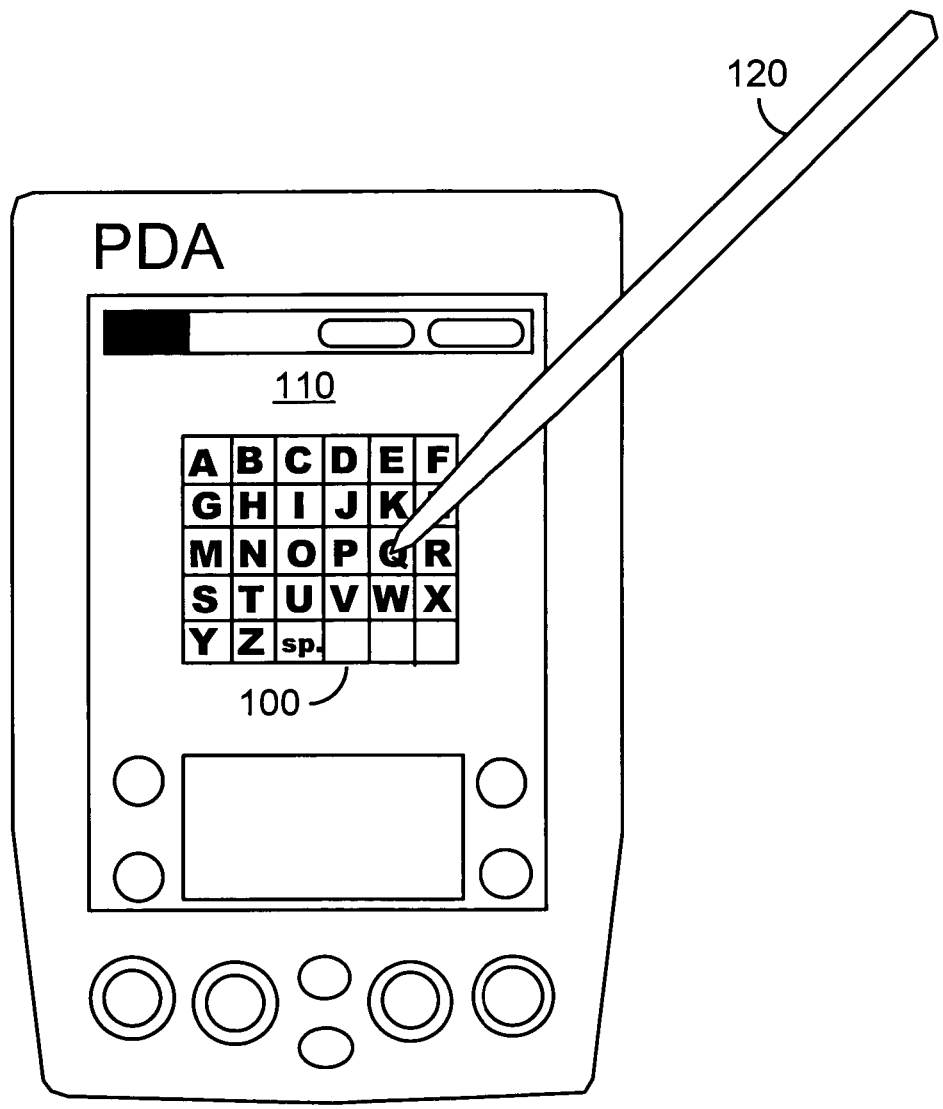
FIG. 1 illustrates a conventional personal data assistant (PDA) and associated input system including a stylus and virtual keyboard displayed on the PDA screen.
Figure 3:
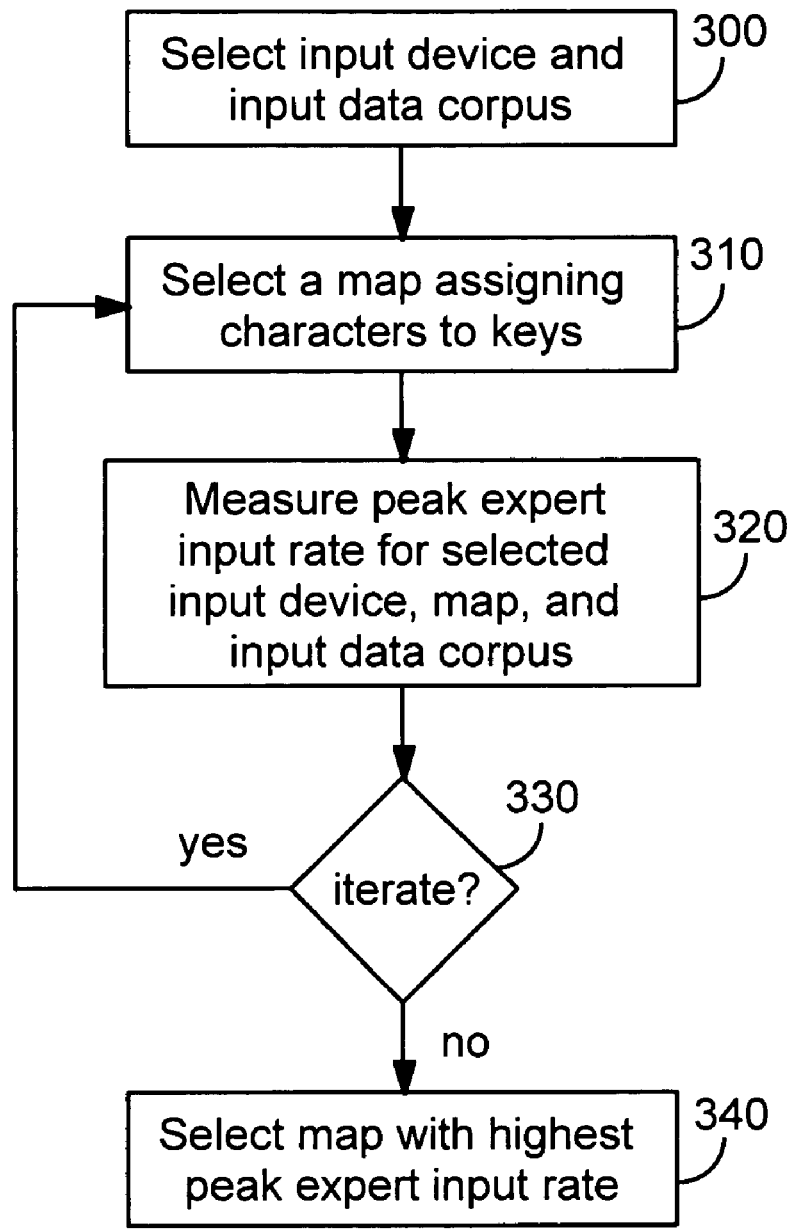
FIG. 3 is a flow chart of an empirical trial-and-error approach to searching for improved input systems.
Figure 4:
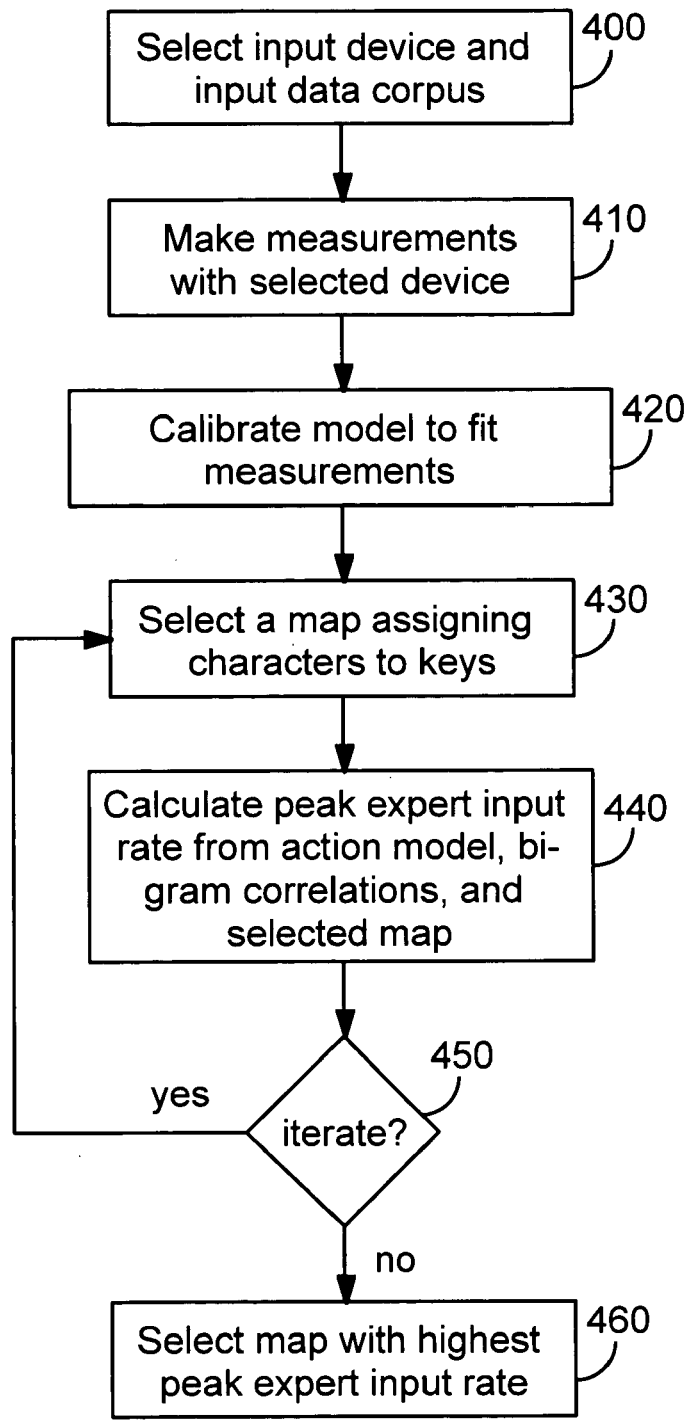
FIG. 4 is a flow chart of a theoretical model-based approach to searching for improved input systems.

Specific embodiments of the present invention will now be described in reference to the drawing figures. Although the method of the present invention is not limited to any particular input device, for purposes of illustration the techniques will be described below primarily as applied to a PDA using a virtual keyboard with stylus for input. Generally, the term input system is defined for the purposes of this description to be a user input device that translates a set of physical user input actions to a set of input signals, together with an interface map that associates the set of input signals to a corresponding set of meaningful signifiers that users may intend to communicate using the device. For example, the PDA input system used to illustrate the invention has a stylus and virtual PDA keyboard as the input device, and the interface map associates the keyboard squares with corresponding characters. Other examples of input systems are stylus and keyboard input systems for tablet PCs and pocket PCs, touch-screens and keypads for information kiosks and ATMs, keypads for cellular telephones and calculators, pointing devices for computers, input systems specially designed for disabled users, gesture gloves for virtual reality systems, and joysticks, steering wheels, foot pedals, and levers for vehicle simulators and arcade games. These examples are not intended to exhaust the possible input systems to which the techniques of the invention may be applied, but are provided merely as illustrative examples.

Figure 5:
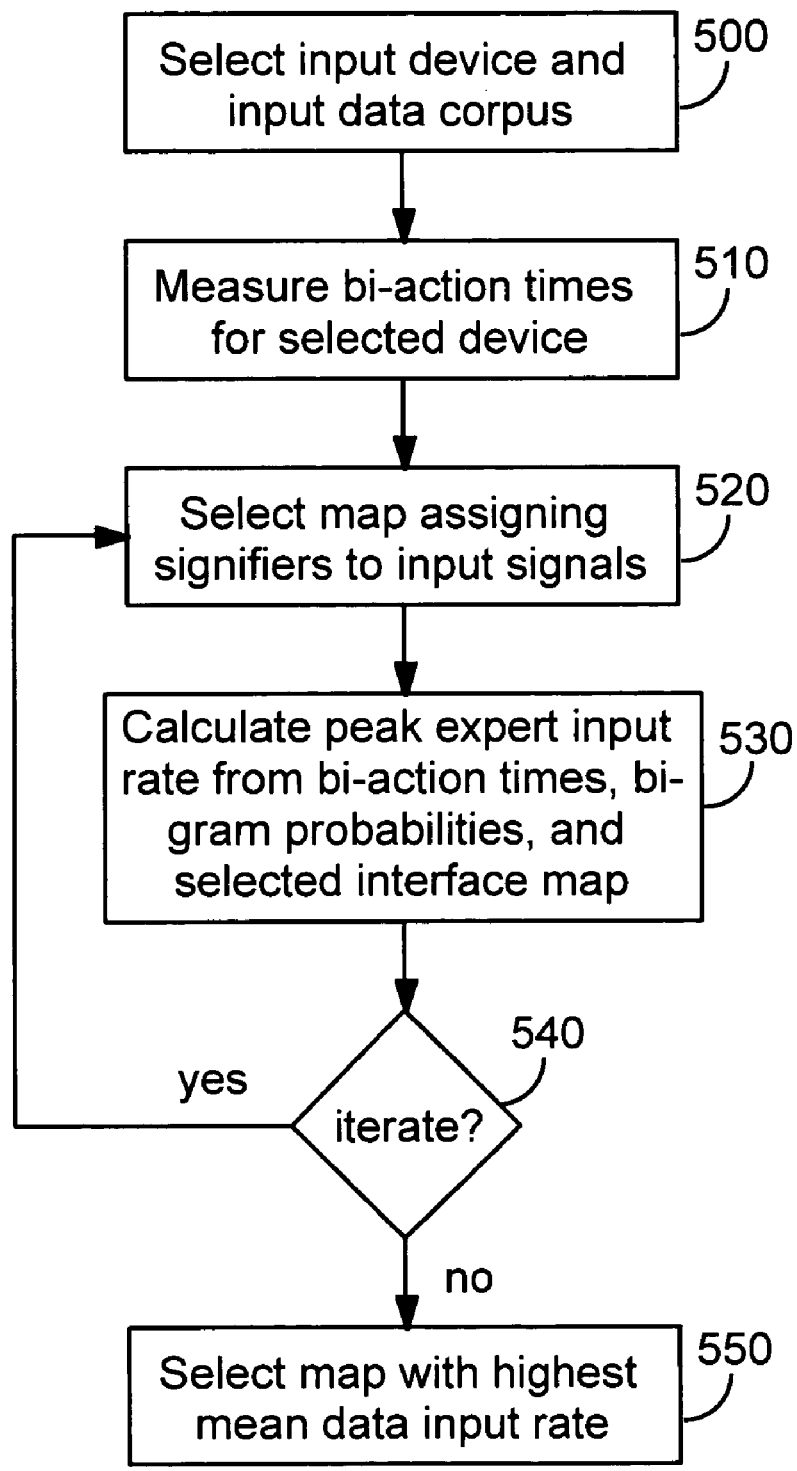
FIG. 5 is a flow chart of an approach to searching for improved input systems according to an embodiment of the present invention.

FIG. 5 illustrates a method for optimizing an input system according to an embodiment of the present invention. More specifically, the method may be used to find an interface map that optimizes a peak expert input rate for a given input device, set of representative users, and input corpus. The first step 500 involves selecting the input device and input data corpus. For the purposes of this description an input device is a device that may be used to translate a set of distinguishable physical actions of a user into a corresponding set of input signals. For example, a conventional computer keyboard translates the interactions of ten fingers with a set of keys into a set of electronic signals that is conventionally provided to a computer.

The input data corpus is a representation of the body of information expected to be entered by users of the input system. The body of information normally consists of strings of signifiers, where the signifiers are selected from a predetermined finite set. For example, the signifiers may be characters selected from the standard Western Roman character set, and the body of information may be a set of typical sentences in a particular Western language such as English. Alternatively, the signifiers could be another character set, as would be appropriate for an Eastern European language, for example. The body of information might be limited to specific styles or types of usage in a particular language in order to accurately represent expected usage of the input system. The body of information is preferably analyzed and reduced to statistical data representative of the body of information expected to be entered. For example, a collection of typical sentences in English could be analyzed to determine the frequencies of all ordered pairs of characters (bi-grams). For example, the bi-gram frequency for the ordered pair (F,R) is the frequency that the character F is immediately followed by the character R in the body of information. Bi-gram frequency data for informal English usage is publicly available. Data for a more limited or specialized body of information can be generated using well known data analysis algorithms. Assuming the body of information accurately represents the information users will enter using the input system, these bi-gram frequencies can be used to predict the probabilities for entering bi-grams.

More generally, input systems are not necessarily limited to character input systems based on key entry. For example, an input system for a virtual reality machine, vehicle simulator, or arcade game might involve very different types of input devices such as foot pedals, steering wheels, joysticks, levers, switches, and input gloves, to name just a few. The interface maps for such input devices translate the input signals generated by these devices into signifiers such as vehicle control commands rather than characters. The input data corpus for this type of input system might represent the collection of control commands expected to be entered by users. For example, a sequence of control commands to shift gears in a manual transmission automobile would form a common sequence of commands in the input data corpus, while the commands to brake and immediately accelerate would be an uncommon sequence. As with a lexical data corpus, such a non-lexical data corpus can be given a statistical representation in terms of frequencies associated with ordered n-tuples of control commands.

Figure 6A:
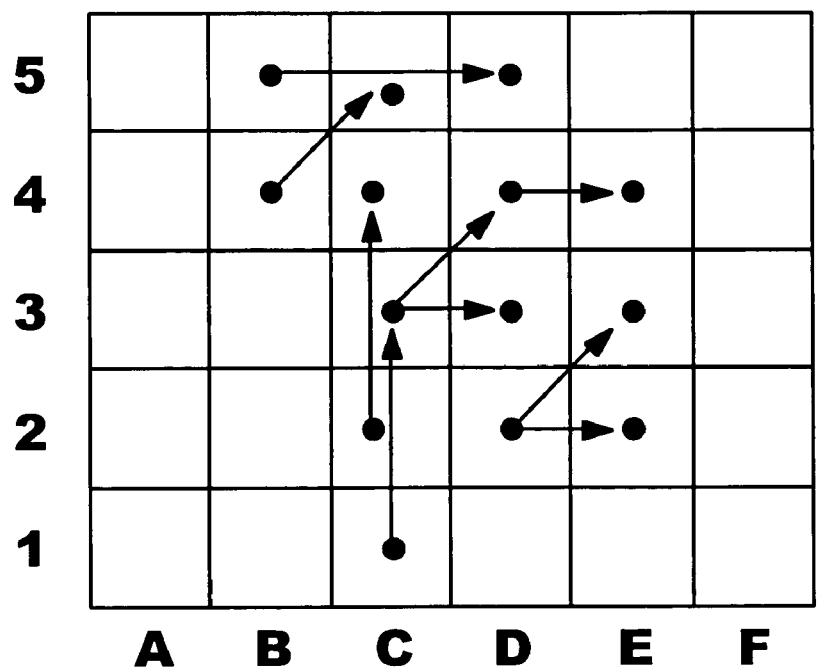
FIGS. 6A and 6B illustrate a set of fast bi-actions and a set of slow bi-actions, respectively, that are measured for the input system of FIG. 1 according to techniques of the present invention.
Figure 6B:
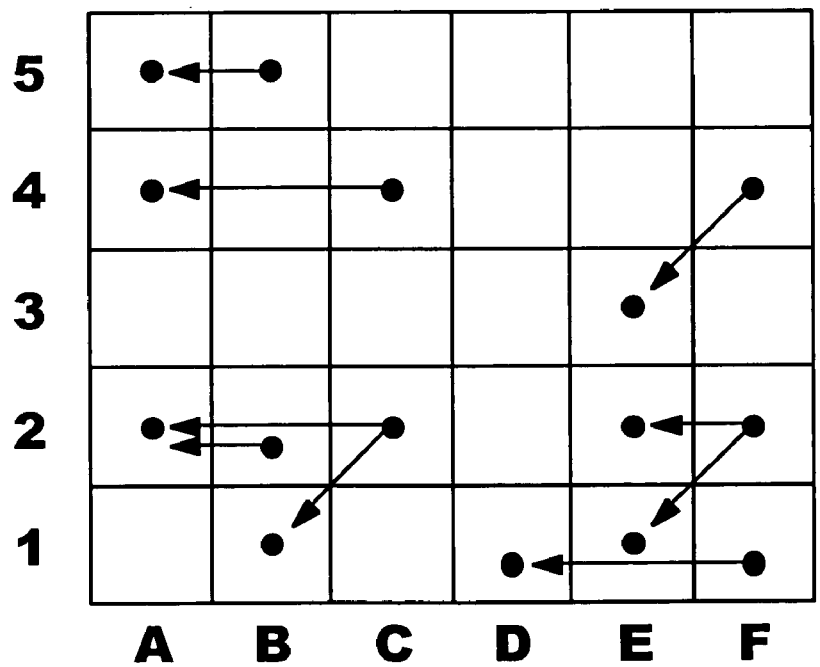

The second step 510 of the method illustrated in FIG. 5 involves the empirical measurement of bi-action times for the selected input device. An action in the present context is used to refer to a physical user movement during the user's interaction with the input device. An action may be selected from a finite set of physical user actions that are translated by the device into a corresponding set of distinct input device signals. For example, an action may be the movement of a hand when tapping a square on a PDA display, the movement of a finger hitting a keyboard key, or the movement of a foot pressing a pedal. For the purposes of this description, a bi-action is defined to be an ordered pair of actions (i,j) performed consecutively. A bi-action time is a time required for a user to perform the second action immediately after performing the first action i. More specifically, the bi-action time is the time interval between the completion of the first action i and the completion of the second action j. In the case of a PDA virtual keyboard and stylus, for example, bi-actions are ordered pairs of taps on the displayed PDA keys, and bi-action time for a bi-action is the time interval between the tap on the first key and the tap on the second key. FIGS. 6A and 6B illustrate various bi-actions on a 6×6 virtual keyboard, where key taps are indicated by black dots and bi-actions by arrows from one dot to another. A bi-action may be represented by an ordered pair of keys. For example, by labeling the key columns A, B, C, D, E, F and the key rows 1, 2, 3, 4, 5, 6, as shown in the figure, a bi-action (i,j) from key C3 to key D4 can be written (C3, D4). With 36 total actions, there are $36^2=1296$ distinct bi-actions or, more generally, $36^n$ distinct n-actions.

The 1296 bi-action times may be empirically determined by measuring, for each bi-action (i,j), the time required for a user to perform the second action immediately after performing the first. Preferably, a set of representative users is identified, taking into consideration their physical abilities to interact with the device and perform the actions. For example, in the case of the stylus and keyboard input system for the PDA it is important to take into consideration whether the users have arthritic problems and whether they are right-handed or left-handed. Such obvious idiosyncrasies should be accounted for since these factors will likely influence the bi-action times. Preferably, the set of users is selected to be substantially uniform in their physical abilities. Alternatively, variations in their abilities are selected to correspond to variations expected for the population of users for which the input system is being designed.

In one approach to empirically determining bi-action times, the set of bi-actions is sequentially presented in random order to each of the representative users, and for each bi-action (i,j) the user is instructed to perform the indicated bi-action as quickly and accurately as possible. The bi-action time is recorded and the next bi-action in the random sequence is presented. Preferably, the entire set of bi-actions is presented to each user several times so that multiple data points are measured for each bi-action time. It should be emphasized that these empirically measured bi-action times are independent of the interface map for the input device. To ensure this independence, the keys are not given character layout during the empirical measurement of bi-action data but remain, for the most part, blank squares. Each bi-action is presented by briefly marking the two keys "1" and "2", by flashing the two keys in sequence, or some other temporary indication.

After the bi-action times are recorded, the data is preferably processed to produce a single consolidated bi-action table. For example, for each user and each bi-action (i,j), anomalous data points may be eliminated from among the multiple data points measured by discarding any bi-action time that is more than twice the duration of the shortest bi-action time measured for that user and bi-action. After discarding these anomalous bi-action times, the remaining times for the bi-action are averaged to produce a mean bi-action time for the user. Then, a consolidated bi-action time E(i,j) in the consolidated table may be computed by averaging these mean bi-action times over the set of users. This is then repeated for each bi-action (i,j) to generate all the entries E(i,j) in the consolidated table. The above technique generalizes in an obvious way to the empirical determination of tri-action times (i,j,k) or, more generally, n-action times, for any positive integer $n \geq 2$. For each n-action, one simply measures the total time to perform the n−1 actions immediately after performing the first action. The bi-action data table is stored for later use, so that its information will be available for calculations of peak expert input rates, as will be described later.

Figure 7:
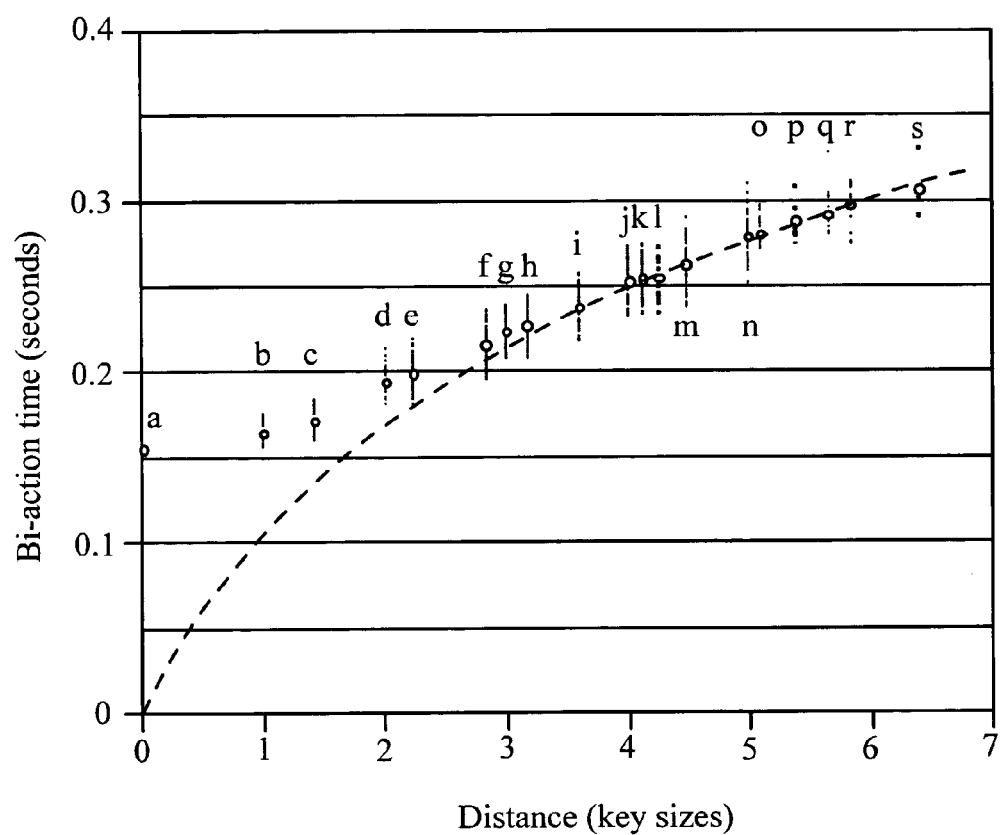
FIG. 7 is a scatter plot of bi-action times measured according to techniques of the present invention with a graph of Fitts' law superimposed.

FIG. 7 is a scatter plot of empirical bi-action times measured for a stylus and virtual keyboard PDA input device such as the device shown in FIG. 1. The bi-actions are grouped into clusters based on the distance between the two keys of the bi-action. As is evident from the scatter plot, the bi-action times within each cluster have a variation of 10% to 20%, indicating that bi-action times depend not only on the distance between keys, but on other factors as well. These dependencies on other factors are ignored in the theoretical models used in the prior art, since those models assume that bi-action times depend only on the distance between keys (and the size of the second key, which is constant in this case). In contrast, the empirically determined bi-action data measured and used in the present embodiment captures these other factors, and is thus more accurate than the theoretical models. Insight into the nature of these factors can be discerned from a comparison of FIGS. 6A and 6B, which show relatively fast bi-actions and relatively slow bi-actions, respectively, for bi-action clusters labeled b, c, and d in FIG. 7. As shown in FIG. 6A, these fast bi-actions are all movements upward and/or from left to right, and they are all centrally located in the keyboard. In contrast, the slow bi-actions shown in FIG. 6B are all movements downward and/or from right to left, and they all start or finish near an edge of the keyboard. This comparison demonstrates that bi-action times depend significantly not only on distance between keys, but also on factors such as the absolute positions of the keys and the direction of motion between the two keys involved in the action. The empirical bi-action table captures these factors, while the theoretical models do not.

The scatter plot of FIG. 7 also illustrates another shortcoming of theoretical models. The theoretical prediction of Fitts' law, which is graphed as a dashed curve superimposed on the scatter plot, agrees roughly with the mean points of the clusters for larger bi-actions, but departs significantly from empirical bi-action data as the bi-action distances get smaller. Considering the fact that smaller bi-actions are very frequent, especially in an optimized input system, this discrepancy between the theoretical model and the empirical data underlies the errors and inaccuracies associated with methods for optimizing input systems based on theoretical models such as Fitts' law. The method of the present invention, on the other hand, is based on empirical bi-action data and does not suffer from these problems.

Returning now to FIG. 5, after the bi-action data E(i,j) have been determined from empirical measurements, an interface map is selected for evaluation in step 520. For the purposes of this description, an interface map is a map that associates a set of input device signals to a corresponding set of meaningful signifiers that users may intend to communicate using the device. The signifiers correspond to the basic elements (e.g., characters, symbols, control commands) that compose the body of information expected to be entered by users of the input system. The interface map, in other words, maps input signals corresponding to physical user actions performed using the input device into signifiers of the input data corpus. For a given device, the interface map therefore determines a unique correspondence K between user actions and data corpus signifiers. In particular, if user action i corresponds to data corpus signifier a, then we write i=K($\alpha$). Because each interface map determines one unique correspondence K for a given device, we sometimes refer to K simply as the interface map. Different interface maps are used to assign different meanings to the physical user actions, even though the set of actions that the input device recognizes and translates into electronic signals remains the same. For example, the various keyboard layouts shown in FIGS. 2A-2D represent different interface maps from the set of keys to the set of characters, thereby giving different interpretations to a user's physical key tap actions.

After an interface map is selected, step 530 calculates a peak expert input rate. Rather than calculating the rate from a theoretical model of the input device, preferred embodiments of the present invention use empirical bi-action data. More specifically, for each bi-action (i,j), an associated bi-gram ($\alpha,\beta$) is determined using the correspondence K, i.e., using the selected interface map and a device-determined correspondence between the set of user actions and the set of input signals. Using the input data corpus information, the predicted probability $P(\alpha,\beta)$ that a user will enter the bi-gram ($\alpha,\beta$) is multiplied by the stored empirically determined bi-action time $E(i,j)$ for the corresponding bi-action, $(i,j)=(K(\alpha),K(\beta))$. These products are summed over the entire set of bi-grams to obtain a mean bi-gram execution time $M_K$, the reciprocal of which is the peak expert input rate, $R_K$. In mathematical terms, $$M_K = \sum_{\alpha\beta} P(\alpha,\beta)E(K(\alpha),K(\beta)), R_K = 1/M_K,$$

where the sum is over all ordered pairs ($\alpha,\beta$) of bi-grams. Generalizing to n-grams, the analogous calculation is $$M_K = \sum_{\alpha,...,\beta} P(\alpha,...,\beta)E(K(\alpha),...,K(\beta)), R_K = 1/M_K,$$

where the sum is over all ordered n-tuples ($\alpha, ..., \beta$) of n-grams, $P(\alpha, ..., \beta)$ is the predicted probability that a user will enter the n-gram ($\alpha, ..., \beta$), and $E(i, ..., j)$ is the empirically-determined n-action time for the corresponding n-action $(i, ..., j)=(K(\alpha), ..., K(\beta))$.

Figures 2A, 2B:
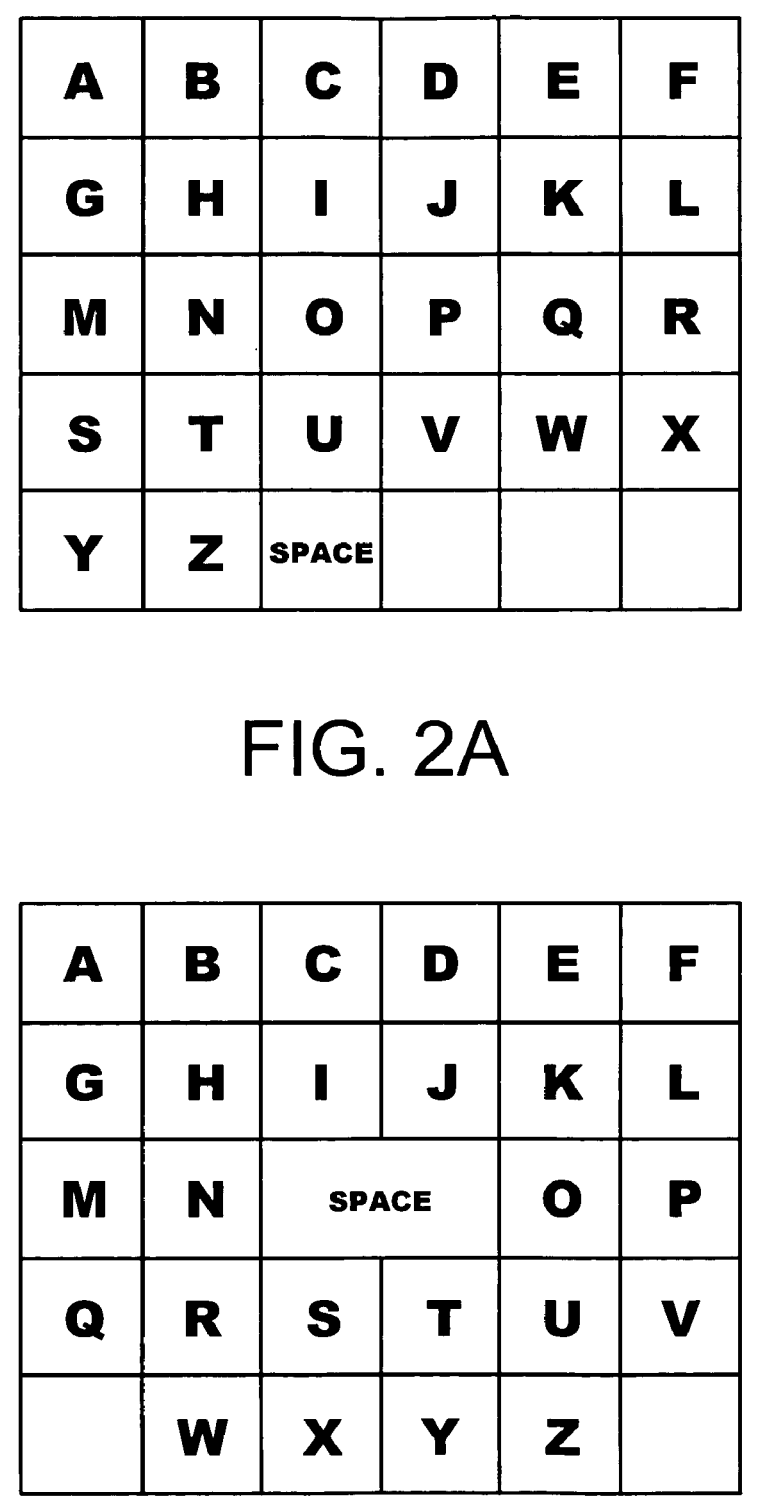

At decision block 540 it is decided whether or not to select another interface map and repeat the peak expert input rate calculation for that map. In one embodiment, a predetermined set of a few interface maps to test are selected in advance and the loop continues until the peak expert input rate has been calculated for each map. When the loop is completed, the map with the highest peak expert input rate is selected in step 550. In another embodiment, the loop is performed as part of a search for the interface map that minimizes the mean bi-gram execution time or, equivalently, maximizes the peak expert input rate. In yet another embodiment, peak expert input rates for multiple maps are computed in parallel. More generally, those skilled in the art will appreciate that various known optimization strategies can be used with computations of peak expert input rates to search for optimized input systems. This optimization problem has the form of a standard optimization problem known in the art as the quadratic assignment problem (QAP). Although this problem is known to be extremely hard, there are a number of known heuristics that can be employed to find reasonable solutions. For example, genetic algorithms, the Metropolis method, the hybrid ant system, and dynamic simulation, are a few of the heuristic approaches to attacking the quadratic assignment problem that are known in the art. The hybrid ant system is an attractive choice since it is known to find quality solutions quickly. For example, the best layout for the PDA keyboard found using the hybrid ant system combined with the techniques of the present invention is shown in FIG. 8A. The predicted peak expert input rate for this layout is 5.438 characters per second (cps). In comparison, the ABC layout of FIG. 2A has a predicted rate of 4.702 cps. The ABC-center layout of FIG. 2B has a predicted rate of 4.888 cps, a 4% improvement over the ABC layout. The OPTI and FITALY layouts of FIGS. 2C and 2D represent about 12% to 13% improvements, while the layout shown in FIG. 8A is more than a 15% improvement over the ABC layout.

The solution shown in FIG. 8A was found using bi-gram probability data derived by averaging three commonly available bi-gram frequency tables. Differences between these bi-gram frequency tables result in predicted peak expert input rate variations of less than 0.5%, although the resulting layouts can appear quite different, as seen in FIGS. 8B, 8C, and 8D. It is also worth noting that, for the same bi-gram frequency data, near-optimal layouts with nearly maximal peak expert input rates may have very different appearances. Thus, the present invention may be used to provide a set of near-optimal choices for layouts, rather than selecting a single one. A layout from the set of near-optimal choices might be selected based on various other criteria such as the time required to reach expert level, or the predicted peak expert input rate of the layout with respect to left-handed users.

As summarized in the table below, there are several important features of the present embodiment of the invention that distinguish it from existing approaches to optimizing input systems.

TABLE 1

Comparison of three methods of searching for optimal input systems

| EMPIRICAL TRIALS | THEORETICAL MODELS | BI-ACTION MATRIX |
|---|---|---|
| Optimized key layout is found empirically by trial-and-error. | Optimized key layout is found computationally using theoretical model of human movement. | Optimized key layout is found computationally using empirical bi-action data. |
| Input device with given layout tested empirically by training users until they reach expert level to measure peak expert input speed. Measured input times between characters depends on the particular character layout, and would change with different layouts. | Input times for an input device (independent of key layout) are assumed to obey Fitts' law (or other theoretical model). Empirical tests are used to find coefficients that fit the model to the particular device. The model is then used with a bi-gram table for the input corpus to calculate peak expert input rate, and find optimized layouts for the device. | Empirical bi-action matrix (or tri-action tensor) is measured for an input device, independent of any particular character layout. The bi-action matrix can then be used with bi gram info to calculate the peak expert input speed associated with various different layouts without training users to expert level and without pitfalls of theoretical laws. |
| Optimized character map is found by performing new empirical measurements for each character map and device. | Optimized character map for given device is found from theoretical model and bi-gram info without requiring new empirical measurements for each map. | Optimized character map for given device is found from bi-action and bi-gram info without requiring new empirical measurements for each map. |

TABLE 1-continued

Comparison of three methods of searching for optimal input systems

| EMPIRICAL TRIALS | THEORETICAL MODELS | BI-ACTION MATRIX |
|---|---|---|
| Bi-action movement time measured empirically. | Bi-action movement time calculated from theoretical model of human movement (adapted to device), and character map. | Bi-action movement time calculated from measured bi-action time and character map. |
| Minor change to device or layout requires entirely new empirical test. | Change to device requires new empirical test, but change to layout does not | Change to device requires new empirical test, but change to layout does not. |
| Empirical tests require users to be trained to expert level. | Empirical measurements do not require users to be trained to expert level | Empirical measurements do not require users to be trained to expert level. |
| No inaccuracies because no general law is used to model human movement. | Model of human movement is inaccurate for small movements, and fails to represent dependencies on relative and absolute positions of keys. Model is also limited to input devices having keys separated by distances. | No inaccuracies because no general law is used to model human movement. |
| Empirical measurements of input times depend upon a selected key layout. | Empirical measurements of input times depend only on device, not layout. | Empirical measurements of input times depend only on device, not layout. |

As discussed earlier, the techniques of the present invention are not limited to stylus and keypad type input system, nor even to text input systems, but can be applied to virtually any input system where the physical actions of a user can be decoupled from the interface map that translates those actions into meaningful signifiers. In addition, the data corpus is not limited to English or even to text in any language, but may encompass any meaningful class of signifiers used for communication or control. Also, the methods of the present invention are not limited to bi-actions but generalize in a straightforward manner to n-actions, for any positive integer $n \geq 2$. Those skilled in the art will appreciate that various modifications and enhancements to the techniques may be introduced as appropriate for particular needs or desires. To give just a few examples, the techniques may be adapted to assist in the evaluation and optimization of more sophisticated interactive input systems, such as predictive entry systems, or could be enhanced to take into consideration effects such as fatigue and distraction, or to find an optimized interface map based on multiple n-action tables (e.g., a table for right-handers and a table for left-handers). The technique can also be applied to a single individual, such as a disabled person, to determine an optimized input system customized to their particular input device and n-action data based on their use of that single device.

What is claimed is:

1. A computer-implemented method comprising:
providing an input device that translates a set of user movements into a corresponding set of input signals;
empirically determining user input action statistics associated with the input device, a set of representative users, and the set of user movements;
providing input data corpus information representing patterns of signifiers expected to be communicated by users using the input device;
selecting an interface map that maps the set of input signals to a corresponding set of signifiers constituting the patterns of signifiers; and
calculating a peak expert input rate from the user input action statistics, input data corpus information, and interface map.

2. The method of claim 1 wherein the user input action statistics are n-action statistics that comprise, for each ordered n-tuple of distinguishable user input actions, a time to perform a last action of the n-tuple after performing a first action of the n-tuple, where n is an integer greater than or equal to two.

3. The method of claim 1 wherein the user input action statistics are bi-action statistics that comprise, for each ordered pair of distinguishable user input actions, a time to perform the second action immediately after performing the first action.

4. The method of claim 1 wherein the bi-action statistics are represented as a bi-action table of $K^2$ time values, where K is a total number of distinguishable user input actions.

5. The method of claim 1 wherein empirically determining user input action statistics comprises performing empirical measurements involving the set of representative users performing the set of user movements using the input device.

6. The method of claim 1 wherein the empirically determined user input action statistics are independent of any particular interface map for the input system.

7. The method of claim 1 wherein the empirically determined user input action statistics characterize the physical actions of users interacting with the input device, independent of how the set of user movements are translated to signifiers.

8. The method of claim 1 wherein the input data corpus information comprises n-gram statistics representing how often each ordered n-tuple of signifiers appears in the input data corpus, where n is an integer greater than or equal to two.

9. The method of claim 1 wherein the input data corpus information comprises bi-gram statistics representing how often each ordered pair of signifiers appears in the input data corpus.

10. The method of claim 1 wherein calculating the peak expert input rate comprises calculating a mean n-gram execution time by summing, over a set of ordered n-grams, a product of a predicted probability that a user will enter a given n-gram and an empirically-determined n-action time for an n-action corresponding to the given n-gram.

11. The method of claim 1 wherein calculating the peak expert input rate comprises calculating a mean bi-gram execution time by summing, over a set of ordered bi-grams, a product of a predicted probability that a user will enter a given bi-gram and an empirically-determined bi-gram time for a bi-gram corresponding to the given bi-gram.

12. The method of claim 1 further comprising calculating peak expert input rates for multiple interface maps, and identifying at least one interface map having an optimal calculated peak expert input rate.

13. The method of claim 1 further comprising executing an optimization strategy to search for an optimized interface map.

14. An input system comprising an input device that translates a set of distinguishable user movements into a set of unique input signals, together with an interface map mapping the input signals to a set of signifiers, wherein the interface map is determined using the method of claim 12.

* * * * *